US005089925A

United States Patent [19]

Lester

[11] Patent Number: 5,089,925

[45] Date of Patent: Feb. 18, 1992

[54] PROTECTION DEVICE FOR ELECTRONIC CIRCUIT

[75] Inventor: James N. Lester, Essex, Mass.

[73] Assignee: GTE Products Corporation, Danvers, Mass.

[21] Appl. No.: 586,170

[22] Filed: Sep. 21, 1990

Related U.S. Application Data

[62] Division of Ser. No. 361,475, Jun. 5, 1989, Pat. No. 4,998,046.

[51] Int. Cl.[5] ..... H02H 3/18

[52] U.S. Cl. ..... 361/84; 361/55; 361/91; 307/127

[58] Field of Search ..... 361/84, 91, 92, 82, 361/55, 56; 307/127

[56] References Cited

U.S. PATENT DOCUMENTS 3,450,946 6/1969 Camacho ..... 361/55
4,087,847 5/1978 Willett ..... 361/92

OTHER PUBLICATIONS

Quong, Russell, Resettable Electronic Fuse Consists of SCR and Relay, Electronics, 9/77, 361/55.

*Primary Examiner*—Todd E. DeBoer
*Attorney, Agent, or Firm*—Carlo S. Bessone

[57] ABSTRACT

A synchronized ballast for a discharge lamp having an increased dimming range. The ballast includes a combined overvoltage and reverse voltage protection device for an electronic circuit operable from a direct current supply is disclosed.

2 Claims, 2 Drawing Sheets

PROTECTION DEVICE FOR ELECTRONIC CIRCUIT

This is a divisional of co-pending application Ser. No. 07/361,475 filed on Jun. 5, 1989 now U.S. Pat. No. 4,998,046.

FIELD OF THE INVENTION

This invention relates in general to discharge lamps and pertains, more particularly, to an improved dimming ballast for fluorescent lamps.

BACKGROUND OF THE INVENTION

In recent years there has been an increased demand for dimmable arc lamp ballasts. Automotive and computer hot cathode fluorescent backlighting require low cost, compact dimmable ballasts with a dimming range of at least 100:1. Dimmable arc discharge ballasts are not new. There have been many patents issued for various dimming methods and circuits. Lamps can be dimmed by varying a current limiting impedance, source frequency, source voltage, or by rapidly switching the lamp on and off using a variable duty cycle to control intensity. Generally, dimming more than a 5:1 range by varying voltage, frequency, or impedance is difficult. A hot cathode fluorescent lamp usually relies on the arc current to heat the cathodes. Below 70% of rated current the cathodes may be insufficiently heated and the lamp may extinguish. Combinations of voltage, frequency, and impedance variation are possible to extend the dimming range of a hot cathode arc lamp, but the resulting circuits are complex and seldom have a dimming range of more than 50:1.

Varying the lamp on/off duty cycle can be used to achieve a wide dimming range. Often referred to as pulse width modulation (PWM), this technique has been used by many to control lamp brightness. U.S. Pat. Nos. 3,863,102, 3,875,458, 4,392,086, 4,392,087, and 4,358,710 teach varying the lamp current by controlling the power line on/off duty cycle. This method results in a narrow lamp dimming range, considerable power line noise, and only works with AC source voltages.

U.S. Pat. No. 4,682,083 operates in a PWM mode where the dimming circuit shorts the lamp out for controlled periods of time. Ballast power is consumed by the dimming circuit resulting in inefficient operation. U.S. Pat. Nos. 4,286,195 and 4,663,570 disclose varying the lamp arc current on/off duty cycle but do not maintain cathode heat resulting in limited dimming range. In addition, U.S. Pat. No. 4,286,195 will only ignite the lamp at the 100 percent intensity level.

U.S. Pat. No. 4,358,716 shorts the ballast's output power state drive circuitry to ground periodically to effect lamp on/off duty cycle control. This patent uses a free-running timer 170 to control the illumination level of the lamp. Typically, this configuration provides a limited duty cycle As a result, illumination level can not be adjusted from full on to full off. While the switch transistors operate at a frequency between 5000 to 250,000 HZ, the lamp filament circuit is operated at 60 HZ (unsynchronized). U.S. Pat. No. 4,087,722 controls the individual widths of the power pulses to the lamp which results in high ballast loss. The other noted PWM patents above control bursts of pulses to the lamp.

It is desirable to have a full on to full off dimming range. The lamp filaments should be constantly powered, especially at low arc current levels where the main arc current is too low to maintain the filaments at thermally emitting temperatures. It is also desirable to preheat the filaments for a period of time prior to applying the arc current to insure that the lamp does not ignite while the coils are cold which would cause cathode coating material to sputter away and reduce lamp life. Further, it is desirable that the lamp starts at any intensity setting including full off. The ballast should not be sensitive to the load such that it would fail in a no lamp load or worn out filament condition. The arc and filament circuits should be frequency synchronized to avoid lamp flicker due to beat frequencies that could result from unsynchronized frequencies. The lamp current waveform should not contain pulses that might exceed the peak rating of the lamp filament coils. Minimal harmonic content in the lamp current waveform is also desired to reduce radio interference caused by the system. The ballast should be able to operate from an AC or DC power source. The ballast should be low cost and integratable to further reduce size and cost.

The above mentioned patents have deficiencies in one or more of the above desired ballast features.

SUMMARY OF THE INVENTION

It is, therefore, an object of the present invention to obviate the disadvantages of the prior art.

It is still another object of the invention to provide an improved dimmable ballast for discharge lamps which provides an increased dimming range and which can ignite the lamps at any dimming setting.

It is another object of the invention to increase lamp life by reducing cathode coating material sputtering during lamp start-up.

It is still another object of the invention to avoid lamp flicker due to beat frequencies that could result from unsynchronized frequencies. Minimal harmonic content in the lamp current waveform is also desired to reduce radio interference caused by the system.

These objects are accomplished, in one aspect of the invention, by the provision of a dimmable ballast for operating a discharge lamp comprising first and second direct current input terminals and high frequency generating means coupled to the first and second direct current input means for generating a high frequency signal having a predetermined frequency. Semiconductor switch means is electrically connected to receive the high frequency signal from the generating means. Variable pulse width modulator means is coupled to the high frequency generating means and to the semiconductor switch means and includes a one-shot multivibrator having an input trigger signal with a predetermined frequency. The variable pulse width modulator generates a pulsed signal for interrupting conduction of the semiconductor switch means and thereby controlling the intensity of the discharge lamp. Delay means electrically is coupled to the variable pulse width modulator means for delaying the generation of the interrupting signal whereby the voltage across the discharge lamp is zero for a predetermined amount of time after power is applied to the ballast and prior to lamp starting. Transformer and ballast means couple the semiconductor switch means to the discharge lamp.

In accordance with further aspects of the present invention, the minimum pulse width generated from the variable pulse width modulator is less than about one half the period of the high frequency signal. The maximum pulse width generated from the variable pulse width modulator is preferably greater than about the period of the input trigger frequency of said one-shot multivibrator.

In accordance with further teachings of the Present invention, the dimmable ballast further includes constant filament voltage means comprising a filament transformer having primary and secondary windings and fourth and fifth semiconductor switches. The fourth and fifth semiconductor switches couple to the high frequency generating means by way of driver means and biphase generator means and the primary of the filament transformer and are electrically connected to receive the high frequency signal from the generating means.

In accordance with still further aspects of the present invention, the dimmable ballast further includes power factor correcting means in the form of an inductor shunting the secondary winding of the arc transformer. The inductor has a predetermined inductance whereby the inductor and the ballasting capacitor means resonate at the frequency of the signal from the high frequency generating means.

In accordance with still further teachings of the present invention, the dimmable ballast further includes harmonic filter means in the form of an inductor coupling the secondary winding of the arc transformer to the lamp. The inductor of the harmonic filter has a predetermined inductance whereby the filter inductor and the ballasting capacitor means resonate at the second harmonic frequency of the high frequency signal from the oscillator means.

In accordance with still further aspects of the present invention, a combined overvoltage and reverse voltage protection device for an electronic circuit operable from a direct current supply is disclosed. The protection means comprises a semiconductor device and a relay having a coil and a normally-closed switch operative to interrupt power to the electronic circuit. The coil and the semiconductor device (e.g., a zener diode) are connected in series across the first and second direct current input terminals.

In accordance with still further aspects of the present invention, the means coupling the semiconductor switch means to the discharge lamp includes an arc transformer having primary and secondary windings and ballasting capacitor means in series with the discharge lamp.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
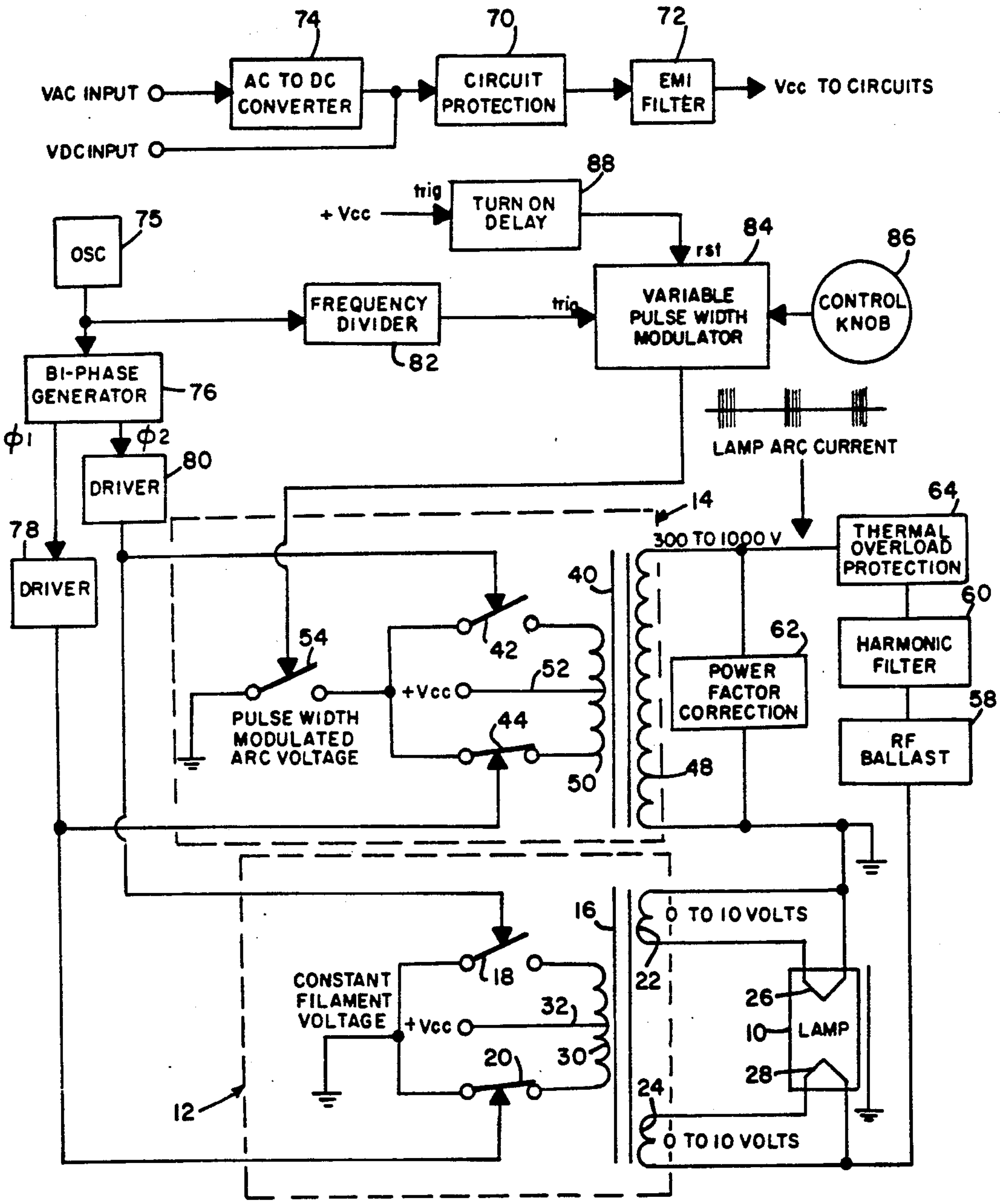
FIG. 1 is a block diagram illustrating the basic form of an improved dimming ballast for use with a fluorescent lamp in accordance with the present invention.

Referring FIG. 1, there is illustrated a block diagram showing the basic form of an improved dimming ballast circuit for use with at least one fluorescent lamp 10. Although only one lamp is shown in FIG. 1 for clarity, it is understood that more than one lamp can be used. To aid in starting, a conventional ground plane may be placed near the lamp, for example, less than ½ inch away. The use of a ground allows for a reduction in the value of the primary arc starting voltage.

Lamp 10 is driven by a constant filament voltage means 12 and an arc current supplying means 14. The arc current supplying means 14 includes arc transformer 40 and first and second semiconductor switches 42 and 44, respectively. Aro transformer 40 contains a single secondary winding 48 (shunting lamp 10) and a primary winding 50. Secondary winding 48 of arc transformer 40 steps the DC supply voltage $V_{cc}$ up to a square wave voltage sufficient to break down the arc gas in the lamp Typically, the secondary winding voltage is between 300 and 1000 volts AC. Primary winding 50 of arc transformer 40 consists of a center-tapped winding having ends thereof coupled respectively to semiconductor switches 42 and 44. The center tap 52 of primary winding 50 is connected to DC supply voltage $V_{cc}$.

Arc current supplying means 14 further includes a third semiconductor switch 54 coupled to a common connection between first and second semiconductor switches 42, 44. One end of third semiconductor switch 54 is coupled to ground and operative to alternatively open and ground the common connection between primary switches 42 and 44. By controlling the grounded—ungrounded duty cycle, it is possible to control the power delivered to the lamp.

Constant filament voltage means 12 includes a filament transformer 16 and fourth and fifth semiconductor switches 18 and 20. Transformer 16 has a pair of secondary windings 22, 24 coupled respectively to lamp electrodes 26, 28. Typically, each secondary winding voltage is less than 10 volts AC. The primary winding 30 of filament circuit transformer 16 includes a center-tapped winding having ends thereof coupled respectively to semiconductor switches 18 and 20 which alternately ground one end of primary winding 30. The center tap 32 of primary winding 30 is connected to a DC supply voltage $V_{cc}$. Typically, $V_{cc}$ is equal to about 12 volts DC. The secondary voltage from filament transformer 16 is in the shape of a square wave.

Preferably, a power factor correcting impedance means 62 is connected in parallel with secondary winding 48 to reduce the reactive loading seen by first and second semiconductor switches 42 and 44. The power factor correcting impedance is equal to the conjugate of the ballasting reactance at the switching frequency of the primary winding switches. This forms an effective parallel inductor-capacitor resonant circuit which resonates at the selected switching frequency. This parallel resonant circuit appears as an open circuit to the power source which leaves only the lamp load resistance to be driven.

A ballasting impedance means 58 (e.g., a capacitor) is coupled in series with lamp 10 and secondary winding 48 to limit the current delivered to lamp 10 by dropping the excess secondary winding voltage thereacross.

An harmonic filter means 60 is also shown coupled in series with the lamp to reduce electromagnetic noise and to improve the lamp arc current waveshape. The harmonic filter similarly is chosen to resonate with the RF ballast at two times the switching frequency (i.e., the second harmonic frequency). A series resonant circuit appears as a short circuit, however, since the source voltage is a square wave which contains only odd harmonics, the second harmonic short circuit does not appear as a load to the primary power switching source. At harmonic frequencies higher than two times the operating frequency, the harmonic filter impedes the flow of current to the arc tube thereby leaving an arc tube current that is primarily sinusoidal at the fundamental switching frequency.

To prevent component failure due to an improper load condition, thermal overload protection means 64 is also coupled in series with the lamp.

Proceeding to the top of the block diagram in FIG. 1, the input supply voltage ($V_{ac}$ or $V_{dc}$) preferably passes through protection circuitry means 70 and an electromagnetic noise filter means 72. If the input supply voltage is AC, the voltage is first converted to DC using a well known AC to DC converter means 74. The voltage supplied to the remainder of the ballast is a conditioned DC voltage $V_{cc}$.

In FIG. 1, a high frequency generating means includes an oscillator means 75 operating at a frequency such as 80 KHZ and a bi-phase generator 76. The output of oscillator means 75 is coupled to bi-phase generator means 76 which converts the 80 KHZ oscillator signal to two 40 KHZ squarewaves $\phi$1, $\phi$2 which are 180 degrees out of phase with each other. Signals $\phi$1, $\phi$2 are coupled respectively to driver means 78, 80 which control the alternate switching action of the four primary winding switching devices 18, 20, 42, 44.

The output of oscillator means 75 in FIG. 1 is also coupled to a frequency divider circuit means 82 which divides the 80 KHZ input frequency by 512 to produce a signal of 156 HZ. The output of frequency divider circuit means 82 provides a trigger signal to a pulse width modulator (PWM) 84 with a variable duty cycle. The output of PWM 84 is coupled to third semiconductor switch 54. By varying the on-off duty cycle of semiconductor switch 54, the arc power delivered to the lamp is varied. Since the filament, arc, and PWM circuits are all driven by the same oscillator in a digital manner, they are therefore, all frequency and phase synchronized resulting in no noticeable lamp flicker.

The frequency of oscillator 75 can be any value above about 40 KHZ which will keep the lamp frequency above 20 KHZ and the range of human hearing. At an oscillator frequency above 1 MHZ, the circuit design and system wiring layout become more difficult. The divide by 512 circuit effectively sets the low level light resolution. The larger the divisor, the finer the lower light level adjustment resolution. It is desirable to maintain a frequency above 70 HZ to the PWM since this is a modulation frequency which will be seen in the flicker output of the lamp. Since the eye cannot detect flicker below 70 HZ, the output of the divide by circuit should be at least 70 HZ. A minimum divisor value of would result in a two brightness dimming range and a frequency of 20 KHZ which is not too useful.

The PWM has two additional inputs which affect its output. A duty cycle control means 86, such as a variable resistor or DC voltage, is used to set the duty cycle allowing for remote control of lamp intensity. A turn-on delay circuit means 88 is coupled to the reset terminal of pulse width modulator 84 so as to hold PWM 84 in a reset state for a short period of time (e.g., 0.5 second) when power is first applied to the circuit. This keeps the PWM power switch 54 in the arc primary circuit in an off state. As a result, the voltage across secondary winding 48 of transformer 40 is maintained at zero to prevent the flow of arc or glow current through the lamp. Lamp filaments 26, 28 are allowed to preheat for the period of time as determined by the turn-on delay. Lamp life is extended by the heating of its electrodes to a thermally emitting state prior to the establishment of arc current.

The PWM adjustment range should allow for an on time that varies from less than the turn on stabilization time of the lamp to an on time that is greater than the period of oscillation seen from the divide by circuit. This allows for a minimum of zero arc current through a maximum of full arc current.

The open circuit arc supply secondary voltage is chosen to always be sufficient to break down the lamp, even if only one half of a cycle of power is delivered to the lamp. This insures that the lamp will ignite at any dimmed level without having to reset to a full on condition during turn on.

The circuit contains primarily digital electronic components which can be integrated into a single circuit component minimizing the size, weight, and cost of the ballast. The basic components necessary to operate a fluorescent lamp over an infinite dimming range are included in this circuit.

The output voltages of the arc and filament circuits are stiff, unballasted voltages which allows for the addition of multiple lamp loads on a single ballast. Extra filament windings would be needed as well as additional RF ballasts.

Figure 2:
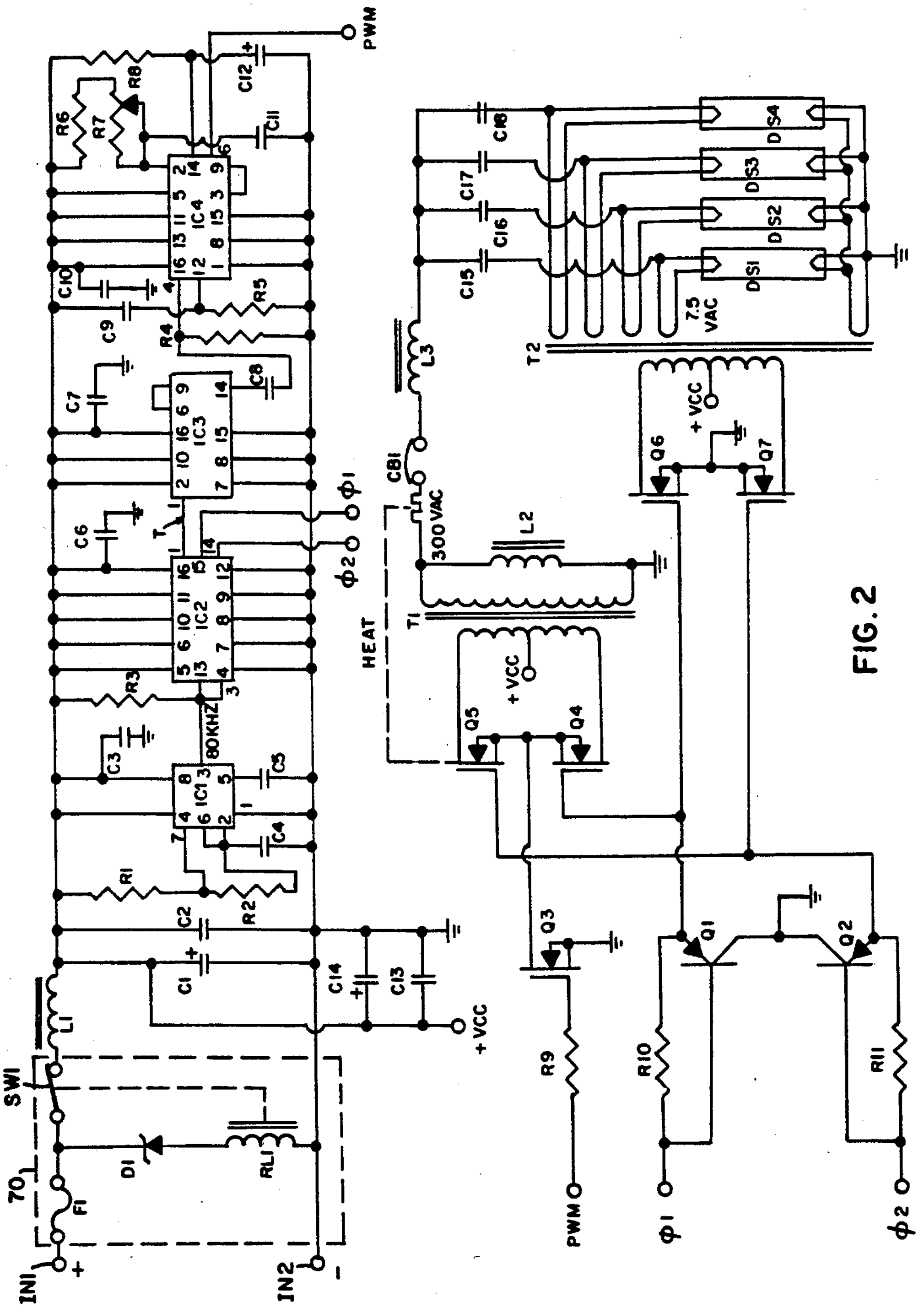
FIG. 2 is a circuit diagram of a specific embodiment of the present invention.

Reference is made to FIG. 2 which illustrates a detailed schematic of one embodiment of the present invention suitable for use with four fluorescent lamps DS1, DS2, DS3, DS4. Extra filament windings and ballasting capacitors are added. The embodiment in FIG. 2 can be used for instrument backlighting applications in an automobile. No ground plane starting is used as the open circuit arc voltage is sufficient to start the lamp without a ground plane.

The circuit is powered from a 13.5 volt direct current outlet represented by a positive input terminal IN1 and a negative input terminal IN2. Positive input terminal IN1 is connected to circuit protection means 70 which includes a safety fuse F1. Means 70 further includes a combined overvoltage and reverse voltage protection means which includes a zener diode D1 and a relay coil RL1 which operates a normally-closed switch SW1. The series connection of zener diode D1 and relay coil RL1 is electrically connected in parallel with the 13.5 volt DC supply. Switch SW1 is coupled in series with positive input terminal IN1. When the input voltage is greater than the breakover voltage of zener diode D1, current flows through relay coil RL1 to cause switch SW1 to open and thereby protect the circuit from the overvoltage condition. Similarly, if input terminals IN1, IN2 are reversed wherein positive input terminal IN1 is incorrectly connected to the negative pole of the input supply and the negative input terminal IN2 is connected to the positive pole of the input supply, switch SW1 will be caused to open.

Inductor L1 and capacitors C1 and C2 form an input electromagnetic interference and power supply filter network. The filtered voltage is applied to the rest of the ballast network. Capacitors C13 and C14 are noise bypass and high frequency power filter components.

Integrated circuit IC1 is an 80 KHZ oscillator whose frequency is set by resistors R1 and R2 and capacitor C4. The output from integrated circuit IC1 is connected to a dual flip flop integrated circuit IC2. Resistor R3 acts as a pull up at the input of IC2 to insure the proper triggering of IC2. The output of IC2 consists of three separate 40 KHZ square wave signals $\phi 1$, $\phi 2$, T. Signal $\phi 1$ and T are identical, while signal line $\phi 2$ is out of phase by 180 degrees with respect to $\phi 1$ and T. Signals $\phi 1$ and $\phi 2$ drive the output power stages while signal T drives the PWM circuit. Preferably, signal T is separated from the noisy $\phi 1$ signal to avoid false triggering of the PWM circuit. Capacitors C3, C5 and C6 are noise bypass capacitors.

Signal T from the output of IC2 is connected to the input of counter integrated circuit IC3 which divides the 40 KHZ input signal by 256 to produce a 156 HZ square wave output signal. The output signal of IC3 triggers a PWM integrated circuit IC4 through a pulse forming network composed of capacitor C8 and resistor R4. The pulse width (e.g., 2 microseconds at 50% width) is narrower than the minimum PWM output pulse width in order to avoid multiple triggering and possible erratic circuit performance. Capacitors C7 and C10 are noise bypass capacitors. The 156 HZ frequency is sufficiently high to avoid the visible lamp flicker that would occur below about 70 HZ.

Integrated circuit IC4 is a dual retriggerable one-shot multivibrator. One half of the circuit is used for PWM control while the other half is used to delay the operation of the PWM circuit when power is applied to the circuit. The use of a one-shot multivibrator in the dimming circuit instead of a free-running oscillator provides an almost infinite dimming range.

Capacitor C9 and resistor R5 comprise a pulse forming network that triggers one half of IC4 into a reset state when power is applied to the circuit. The time constant of the reset circuit is set by resistor R8 and capacitor C12. The reset circuit output holds the PWM circuit in a reset state until the reset circuit times out, in this case, after 0.5 seconds. During the delay, the arc voltage across the lamps is zero to insure that no current (glow or arc) flows through the lamps. Once the reset circuit times out, the PWM circuit is free to operate. A variable width pulse appears at the output of the PWM circuit each time it is triggered by the signal from IC3. The width of the output pulse from IC4 is set by capacitor C11 and resistors R6 and R7. Resistor R6 sets the minimum pulse width while variable resistor R7 is used to adjust the pulse width out to a maximum. Resistor R7 should have an audio taper to achieve smooth low level intensity control.

To obtain a zero to 100% full intensity control, the minimum on time of each output switching transistor should be one half of the 40 KHZ drive signal or 12.5 microseconds. The lamp takes up to 4 cycles of 40 KHZ or 100 microseconds to stabilize in the on condition. One complete 40 KHZ cycle just generates a detectable amount of light. Two cycles generates about 70 percent of the stabilized light output. To insure a full off state, the minimum PWM pulse should therefore be less than about 12.5 microseconds. The narrower the pulse, the less power delivered to the lamp. A pulse width less than 12.5 microseconds is visibly insufficient to break down the arc gas so the lamp effectively remains off.

If the PWM output is wider than the input trigger pulse repetition time, the PWM will be retriggered before it times out and the PWM output will remain on continuously. The input trigger frequency of 156 HZ has a period of 6.4 milliseconds. The PWM output pulse width range should be from less than 12.5 microseconds to more than 6.4 milliseconds. The embodiment in FIG. 2 has the range of 8 microseconds to 8 milliseconds which results in a dimming range of more than 1000:1.

The output power stages are driven by the 40 KHZ signals $\phi 1$ and $\phi 2$. This frequency is chosen to be above the audio limit of 20 KHZ. A higher operating frequency would result in smaller transformers T1 and T2, smaller ballasting capacitors C15 through C18, and smaller harmonic filter choke L3, but circuit losses and wiring sensitivity would increase. The wiring between the lamps and ballast have distributed inductance and capacitance and the filament windings capacitively couple to one another at about 10 picofarads so a frequency of about 40 KHZ is chosen to minimize the effects of these parasitic impedances. The lamps can be remotely mounted without great concern over ballast performance.

One common driver circuit is used for the output power transistor switches Q4 and Q6 and one circuit for Q5 and Q7. Since the inputs of the transistors are mainly capacitive, resistors R10 and R11 allow the transistors to turn on slowly. Drive transistors Q1 and Q2 quickly discharge the power transistor gate capacitors. The slow turn on and quick turn off insures that Q4 and Q5 or Q6 and Q7 are not on simultaneously which would place a short across the primary windings of transformers T1 and T2 causing high peak currents to exist.

The power transistor switches Q4 and Q5 and switches Q6 and Q7 alternately apply 13.5 V DC to each half of the primary windings of the arc and filament transformers causing a square wave of voltage to appear on the secondaries of the transformers. Filament transformer T2 steps the 13.5 V DC down to 7.5 A AC. One filament winding is common to the four lamp loads while the other four filament windings are isolated from one another.

The arc transformer T1 steps the 13.5V DC up to 300 volts AC which is sufficiently high to ignite the lamp loads without a ground plane. Capacitors C15, 16, 17, and 18 are the arc current ballast impedances.

Inductor L3 forms an harmonic filter which is tuned with the parallel combination of C15, C16, C17, C18 to 80 KHZ. Only odd harmonics exist in a square wave circuit so it is safe to tune the harmonic filter to 80 KHZ. The odd harmonics of 40 KHZ of 120 KHZ, 200 KHZ, 280 KHZ, 360 KHZ, etc. are substantially attenuated by L3 improving the lamp current waveform by reducing peak currents.

Inductor L2 acts as a power factor correcting impedance for the four ballasting capacitors. Inductor L2 is chosen to resonate with the parallel combination of C15, C16, C17, and C18 at 40 KHZ to minimize the reactive load seen by the power transistors Q4 and Q5. Preferably, inductor L2 is integrated into transformer T1 by placing a gap in the magnetic path of T1. This increases the magnetizing current of T1 which creates the inductance L2.

Transistor Q3 is the PWM power switch and connects the source terminals of transistors Q4 and Q5 to ground with a varying on-off duty cycle. When Q3 is on, Q4 and Q5 can deliver power to the arc transformer T1. Lamp arc power is therefore varied from zero to maximum as the PWM circuit resistor R7 is varied and the on time of Q3 is varied.

Thermal circuit breaker CB1 senses transistor Q5's temperature and opens up the arc output if an improper load is connected in place of the specified lamp.

When low power lamp loads are used, such as a 1 or 2 watt display backlighting lamp, it is possible to simplify the output power circuit. Increasing gate drive resistors R10 and R11 from 100 ohms to 10K ohms acts to reduce the peak current to the lamp by causing transistors Q4 and Q5 to turn on very slowly and allows the elimination of harmonic filter L3. This does increase the loss in Q4 and Q5 and reduces ballast efficiency to about 50%, but the low power levels allow for the absence of bulky transistor heat sinking materials and L3. Normally ballast capacitors C15, C16, C17, and C18 appear as decreasing impedances to the upper harmonics of the 40 KHZ square wave supplied by transformer T1. By turning Q4 and Q5 on slowly, the leading edge of the square wave is softened which greatly reduces the harmonic currents drawn by the lamp load. Above two watts of lamp power, it is necessary to heatsink transistors Q3, Q4, and Q5 or add harmonic filter L3 and reduce the drive resistance in R10 and R11 to improve circuit efficiency.

Although the lamps in FIGS. 1 and 2 are supplied with filament heat, the circuit can be used with cold cathode lamps which do not contain filaments to be heated but do require high open circuit arc voltages to break down the arc. The circuit can be modified by eliminating the filament drive circuitry T2, Q6, Q7 and by increasing the arc voltage up to 1000 volts to enable cold cathode lamps to be driven.

As a specific example but in no way to be construed as a limitation, the following components are appropriate to an embodiment of the present disclosure, as illustrated by FIG. 2:

| Item | Description | Value |
|---|---|---|
| C1 | Capacitor | 10 MFD |
| C2 | Capacitor | 0.1 MFD |
| C3 | Capacitor | 0.1 MFD |
| C4 | Capacitor | 0.001 MFD |
| C5 | Capacitor | 0.1 MFD |
| C6 | Capacitor | 0.1 MFD |
| C7 | Capacitor | 0.1 MFD |
| C8 | Capacitor | 120 PFD |
| C9 | Capacitor | 0.001 MFD |
| C10 | Capacitor | 0.1 MFD |
| C11 | Capacitor | 0.022 MFD |
| C12 | Capacitor | 10 MFD |
| C13 | Capacitor | 0.1 MFD |
| C14 | Capacitor | 150 MFD |
| C15 | Capacitor | 500 PFD |
| C16 | Capacitor | 500 PFD |
| C17 | Capacitor | 500 PFD |
| C18 | Capacitor | 500 PFD |
| CB1 | Thermal Breaker | SB606G3H |
| D1 | Zener Diode | VR12 |
| DS1 | Fluorescent Lamp | 5 WTT |
| DS2 | Fluorescent Lamp | 5 WTT |
| DS3 | Fluorescent Lamp | 5 WTT |
| DS4 | Fluorescent Lamp | 5 WTT |
| F1 | Fuse | 3A |
| IC1 | Integrated Circuit | 555 |
| IC2 | Integrated Circuit | 4027 |

-continued

| Item | Description | Value |
|---|---|---|
| IC3 | Integrated Circuit | 4520 |
| IC4 | Integrated Circuit | 4098 |
| L1 | Inductor | 5 mH |
| L2 | Inductor | 2 mH |
| L3 | Inductor | 8 mH |
| Q1 | Transistor | 2N4403 |
| Q2 | Transistor | 2N4403 |
| Q3 | Transistor (MOSFET) | IRF540 |
| Q4 | Transistor (MOSFET) | IRF540 |
| Q5 | Transistor (MOSFET) | IRF540 |
| Q6 | Transistor (MOSFET) | IRF540 |
| Q7 | Transistor (MOSFET) | IRF540 |
| R1 | Resistor | 1K ohm |
| R2 | Resistor | 7.5K ohm |
| R3 | Resistor | 4.7K ohm |
| R4 | Resistor | 22K ohm |
| R5 | Resistor | 10K ohm |
| R6 | Resistor | 1K ohm |
| R7 | Resistor | 1M ohm |
| R8 | Resistor | 100K ohm |
| R9 | Resistor | 100 ohm |
| R10 | Resistor | 100 ohm |
| R11 | Resistor | 100 ohm |
| RL1 | Relay | 12VSPST |
| T1 | Transformer | 12TCTP to 150 TS |
| T2 | Transformer | 14TCTP to 5 of 4 TS |

There has thus been shown and described an improved dimming ballast for discharge lamps. The invention provides is a delayed arc start ballast for low pressure arc discharge lamps. It can dim multiple lamps over a range of at least 1000:1. It can start lamps at any intensity setting. The arc circuit, filament circuit, and intensity control circuit (PWM) are frequency synchronized to eliminate intermodulation effects such as lamp flicker.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A combined overvoltage and reverse voltage protection device comprising:

first and second direct current input terminals;

a relay having a coil and a normally-closed switch;

a semiconductor device connected in series with said coil, the series connection of said coil and said semiconductor device being coupled across said first and second direct current input terminals;

one end of said normally-closed switch being coupled to said first direct current input terminal, the other end of said normally-closed switch adapted to be coupled to an electronic circuit, said normally-closed switch being operative to interrupt power to the electronic circuit in response to an overvoltage or a reverse voltage detected at said first and second direct current input terminals.

2. The protection device of claim 1 wherein said semiconductor device is a zener diode.

* * * * *